(12) United States Patent
Harada et al.

(10) Patent No.: US 6,752,005 B2
(45) Date of Patent: Jun. 22, 2004

(54) NONRESONANT TYPE KNOCK SENSOR

(75) Inventors: Sadamitsu Harada, Gifu (JP); Katsuki Aoi, Aichi (JP); Tomohiro Hirata, Aichi (JP); Yasuo Ito, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 10/422,806

(22) Filed: Apr. 25, 2003

(65) Prior Publication Data

US 2003/0200790 A1 Oct. 30, 2003

(30) Foreign Application Priority Data

| Apr. 26, 2002 | (JP) | ................................ | 2002-127301 |
| Aug. 23, 2002 | (JP) | ................................ | 2002-243746 |
| Aug. 29, 2002 | (JP) | ................................ | 2002-251320 |

(51) Int. Cl.[7] .............................................. G01L 23/22
(52) U.S. Cl. ..................................................... 73/35.13
(58) Field of Search ........................................ 73/35.13

(56) References Cited

U.S. PATENT DOCUMENTS

| 4,969,352 A | * | 11/1990 | Sellnau ........................ 73/115 |
| 5,329,809 A | * | 7/1994 | Sellnau et al. ................ 73/115 |
| 5,645,765 A | | 7/1997 | Laakman et al. |
| 5,939,616 A | | 8/1999 | Ito et al. |

FOREIGN PATENT DOCUMENTS

| EP | 1 253 122 A1 | 10/2002 |
| JP | 57-113691 | 7/1982 |
| JP | 61-153530 | 7/1986 |
| JP | 2-173530 | 7/1990 |
| JP | 9-306236 | 11/1997 |
| JP | 10-206226 | 8/1998 |
| JP | 2001-4476 | 1/2001 |
| JP | 2001-151566 | 6/2001 |
| JP | 2002-39852 | 2/2002 |
| JP | 2002-55013 | 2/2002 |

\* cited by examiner

*Primary Examiner*—Robert Raevis
(74) *Attorney, Agent, or Firm*—Sughrue Mion, PLLC (57) ABSTRACT

A knock sensor comprises a sensor body having a metallic shell including a cylindrical portion and a flange portion formed at an end of the cylindrical portion, an annular piezoelectric element fitted around the cylindrical portion and an annular weighting member fitted around the cylindrical portion to hold the piezoelectric element between the weighting member and the flange portion, and a resin-molded sensor casing arranged circumferentially around the sensor body. The resin-molded sensor casing includes a weighting portion located nearer to the weighting member than to the piezoelectric element with respect to an axial direction of the cylindrical portion, and at least the weighting portion of the resin-molded sensor casing is made of a resin containing at least one of metal powder and metal oxide powder and has a density of 2.0 g/cm$^3$ or higher.

4 Claims, 8 Drawing Sheets

NONRESONANT TYPE KNOCK SENSOR

BACKGROUND OF THE INVENTION

The present invention relates to a nonresonant type knock sensor that detects the occurrence of knocking in an internal combustion engine.

A knock sensor with a piezoelectric element is commonly used in an ignition control system of an internal combustion engine so as to detect the occurrence of knocking in the engine and thereby allow the control system to provide optimal ignition timing for the engine. There are two types of knock sensors: a resonant type and a nonresonant type. In the case of the nonresonant type knock sensor, the piezoelectric element receives a mechanical load due to engine vibrations caused by the knocking, converts the mechanical load into an electrical signal and outputs the electrical signal to the control system via a band-pass filter so that the control system reads the signal output in a frequency band corresponding to the knocking vibrations to find the occurrence of knocking in the engine.

SUMMARY OF THE INVENTION

Recently, there have been strict environmental regulations. When the piezoelectric element is made free from lead so as to be compliant with such strict environmental regulations, there is a possibility that the signal outputted from the lead-free piezoelectric element is so weak that the control system cannot determine whether the knocking is actually occurring in the engine. In order to avoid such a possibility, it is desired to improve the signal output characteristic of the nonresonant type knock sensor.

In consideration of the fact that the intensity of the output signal from the piezoelectric element depends on the mechanical load applied to the piezoelectric element, one conceivable way to improve the signal output characteristic of the sensor would be to increase the size of any part or portion of the sensor that weights down the piezoelectric element (such as a weighting member or resin-molded sensor casing) so as to add to its weight and thereby increase the mechanical load on the piezoelectric element as disclosed in Japanese Laid-Open Patent Publication No. 2-173530. However, this results in upsizing of the sensor. As there is only a limited space for mounting the knock sensor in the engine, it is difficult to improve the signal output characteristic of the sensor to a sufficient degree in the above-mentioned way.

The present invention has been made allowing for the above-mentioned circumstances, and an object of the present invention is to provide a nonresonant type knock sensor that has an increased mechanical load on its piezoelectric element without upsizing of the sensor for improvement in signal output characteristic.

According to a first aspect of the invention, there is provided a knock sensor, comprising: a sensor body having: a metallic shell including a cylindrical portion and a flange portion formed at an end of the cylindrical portion; an annular piezoelectric element fitted around the cylindrical portion; and an annular weighting member fitted around the cylindrical portion to hold the piezoelectric element between the weighting member and the flange portion; and a resin-molded sensor casing arranged circumferentially around the sensor body, wherein the resin-molded sensor casing includes a weighting portion located nearer to the weighting member than to the piezoelectric element with respect to an axial direction of the cylindrical portion, and at least the weighting portion of the resin-molded sensor casing is made of a resin containing at least one of metal powder and metal oxide powder and has a density of 2.0 g/cm$^3$ or higher.

According to a second aspect of the invention, there is provided a knock sensor, comprising: a metallic shell including a cylindrical portion and a flange portion formed at an end of the cylindrical portion; an annular piezoelectric element fitted around the cylindrical portion; and an annular weighting member fitted around the cylindrical portion to hold the piezoelectric element between the weighting member and the flange portion, wherein at least the flange portion of the metallic shell is made of a material having a lower specific gravity than that of iron.

According to a third aspect of the invention, there is provided a knock sensor, comprising: a metallic shell including a cylindrical portion and a flange portion formed at an end of the cylindrical portion; an annular piezoelectric element fitted around the cylindrical portion; and an annular weighting member fitted around the cylindrical portion to hold the piezoelectric element between the weighting member and the flange portion, wherein the flange portion has at least one cut formed therein to reduce the weight of the flange portion.

DESCRIPTION OF THE EMBODIMENTS

The present invention will be described below with reference to the drawings. In the following first to third embodiments, like parts and portions are designated by like reference numerals, and repeated descriptions thereof are omitted.

A nonresonant type knock sensor 100 according to the first embodiment of the invention will be first explained.

Figure 1:
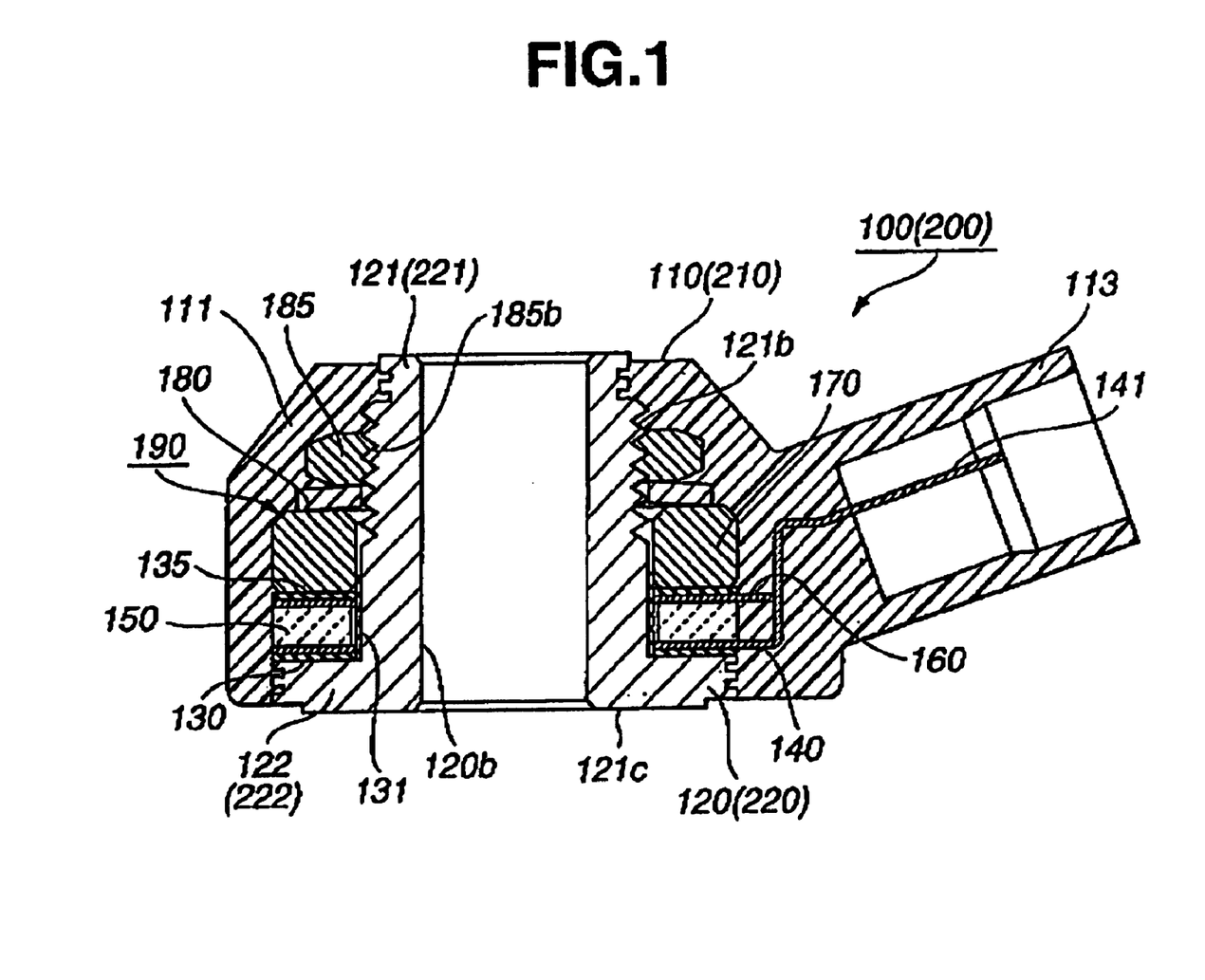
FIG. 1 is a sectional view of a nonresonant type knock sensor according to a first or second embodiment of the present invention.
Figure 2:
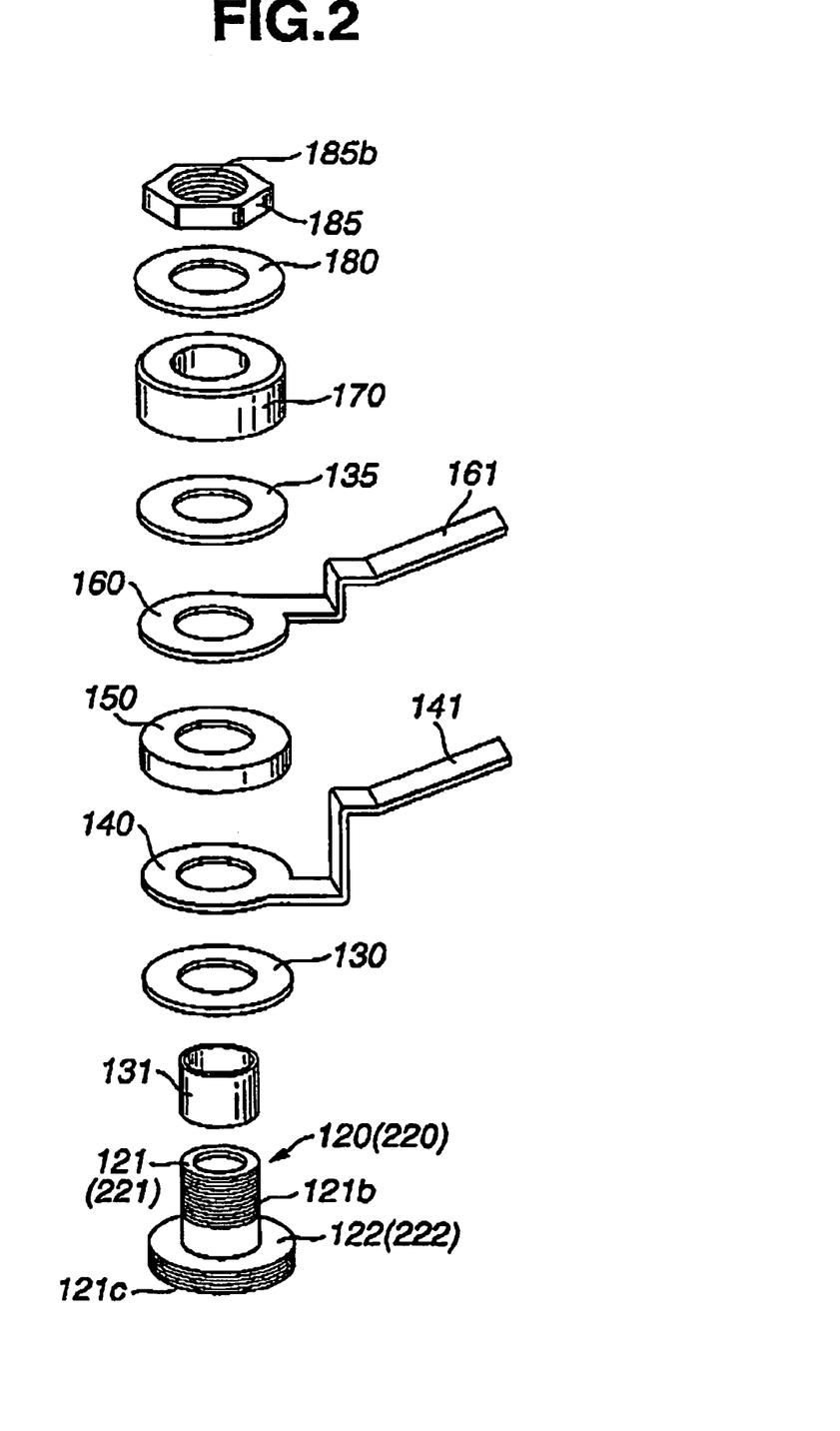
FIG. 2 is an exploded view of a sensor body of the knock sensor of FIG. 1.

As shown in FIGS. 1 and 2, the knock sensor 100 comprises a sensor body 190 having a metallic shell 120, an insulation sleeve 131, annular insulation plates 130 and 135, an annular piezoelectric element 150, annular electrode plates 140 and 160, an annular weighting member 170, a conical spring washer 180 and a nut 185, and a resin-molded sensor casing 110.

The metallic shell 120 includes a cylindrical portion 121 and an annular flange portion 122 formed radially outwardly at an end 121c of the cylindrical portion 121. The cylindrical portion 121 has a thread 121b formed on an outer circumferential surface thereof. Further, a through hole 120b is formed in the metallic shell 120 along an axial direction of the cylindrical portion 121 in order for the knock sensor 100 to be attached to a cylinder block of an internal combustion engine (not shown) by using a bolt (not shown) through the hole 120b and thereby vibrate together with the cylinder block at the occurrence of knocking. It is noted that the knock sensor 100 is mounted on the cylinder block in such an orientation that the flange portion 122 abuts at its bottom side on the cylinder block.

The insulation plate 130, the electrode plate 140, the piezoelectric element 150, the electrode plate 160, the insulation plate 135, the weighting member 170 and the spring washer 180 are fitted around the cylindrical portion 121 of the metallic shell 120 in the order of mention from the flange-portion side. The insulation sleeve 131 is interposed between the cylindrical portion 121 of the metallic shell 120 and the electrode plate 140, the piezoelectric element 150 and the electrode plate 160 so as to keep the electrode plates 140 and 160 and the piezoelectric element 150 electrically insulated from the metallic shell 120. The nut 185 has a thread 185b formed on an inner circumferential surface thereof, and is screwed down against the spring washer 180 in such a manner as to fix the insulation plate 130, the electrode plate 140, the piezoelectric element 150, the electrode plate 160, the insulation plate 135 and the weighting member 170 between the flange portion 122 and the nut 185 by engagement of the threads 121b and 185b. The electrode plates 140 and 160 has output terminals 141 and 161, respectively, formed extendingly to output a signal from the piezoelectric element 150 (i.e. a voltage developed between the electrode plates 140 and 160) to an electronic control unit (ECU, not shown) via a band-pass filter (not shown).

The sensor casing 110 is arranged circumferentially around the sensor body 190 with the hole 120b exposed externally of the sensor casing 110. The sensor casing 110 includes a connector portion 113 in which the output terminals 141 and 161 are accommodated for connection of the knock sensor 100 to the ECU. The sensor casing 110 further includes a weighting portion 111 located nearer to the weighting member 170 than to the piezoelectric element 150 with respect to the axial direction of the cylindrical portion 121 of the metallic shell 120 to contribute to the application of a load to the piezoelectric element 150.

In the first embodiment, at least the weighting portion 111 of the sensor casing 110 is made of a resin containing at least one of metal powder and metal oxide powder and has a density of 2.0 g/cm$^3$ or higher at room temperature. The weighting portion 111 can be formed integral with the other portions of the sensor casing 110 (the whole of the sensor casing 110 can be molded of the resin containing metal and/or metal oxide powder). Alternatively, the weighting portion 111 may be formed separately from the other portions of the sensor casing 110 to have e.g. a layer structure (only the weighting portion 111 may be molded of the resin containing metal and/or metal oxide powder).

A resin-molded sensor casing of a conventional knock sensor is generally made of nylon and has a density of about 1.5 g/cm$^3$, whereas at least the weighting portion 111 of the sensor casing 110 is made of the resin containing metal and/or metal oxide powder and has a density of 2.0 g/cm$^3$ or higher as described above. Accordingly, the sensor casing 110 becomes able to apply an increased mechanical load to the piezoelectric element 150 even when the sensor casing 110 is made in the same size as the above conventional sensor casing. This makes it possible to improve the signal output characteristic of the knock sensor 100 without upsizing of the sensor 100. This also makes it possible to downsize the knock sensor 100 while maintaining the signal output characteristic of the sensor 100 at the same level as that of the conventional knock sensor.

Specific examples of the metal powder usable in the resin include tungsten powder, molybdenum powder, iron powder, stainless steel powder and the like. Specific examples of the metal oxide powder usable in the resin include tungstic oxide powder, molybdenum oxide powder, ferrite powder and the like. These metal and metal oxide powders can be used alone or in any combination thereof.

The metal and/or metal oxide powder added in the resin preferably has a true density of 10.0 g/cm$^3$ or higher at room temperature. If the volume content of the metal and/or metal oxide powder in the resin is relatively large, there is a possibility that the resin may become difficult to mold. When the metal and/or metal oxide powder has a true density of 10.0 g/cm$^3$ or higher, however, it becomes possible to control the density of at least the weighting portion 111 of the metallic shell 110 to 2.0 g/cm$^3$ or higher without adding a large amount of the metal and/or metal oxide powder in the resin and thereby possible to avoid a deterioration in the moldability of the resin. Herein, the "true density" is defined as the density of a solid substance that forms particles of the powder.

The metal and/or metal oxide powder added in the resin can be either electrically conductive or insulative, but the sensor casing 110 preferably has an insulating property in order to provide the insulation between axially opposite sides of the piezoelectric element 150 (e.g. to keep the insulation resistance between the opposite sides of the piezoelectric element 150 of 1 MΩ or higher) and to prevent the electrode plates 140 and 160 from electrically conducting via the sensor casing 110. In the case of the metal and/or metal oxide powder being electrically conductive, it is thus preferable to control the amount, particle size and particle shape of the metal and/or metal oxide powder added. Especially when the sensor casing 110 is molded in one piece, it is desirable that the metal and/or metal oxide powder is electrically insulative so as to secure the insulating property of the sensor casing 110 without regard to the amount, particle size and particle shape of the metal and/or metal oxide powder added in the resin. It becomes therefore possible to control the density of the resin-molding sensor casing 110 to any desired value where the resin is moldable and adjust the mechanical load on the piezoelectric element 150 as appropriate. In particular, the electrically insulative metal oxide powder (such as tungstic oxide, molybdenum oxide and/or ferrite) is desirably used.

In consideration of effects on the human body, the metal and/or metal oxide powder added in the resin is preferably free of lead.

As the resin of the sensor casing 110, a commercially available resin, such as "MC102K07 (high-density resin with a density of 6.0 g/cm$^3$, prepared by adding tungsten powder to electrically insulative nylon 6)" from Kanebo., Ltd., can be used.

Further, the weighting member 170 preferably has a density of 10 g/cm³ or higher at room temperature.

A weighting member of a conventional knock sensor is made of e.g. brass and has a density of about 8.0 g/cm³, whereas the weighting member 170 has a density of 10 g/cm³ or higher. Accordingly, the weighting member 170 becomes able to apply an increased mechanical load to the piezoelectric element 150 even when the weighting member 170 is made in the same size as the above conventional weighting member. This makes it possible to improve the signal output characteristic of the knock sensor 100 without upsizing of the sensor 100. In order to control the density of the weighting member 170 to 10 g/cm³ or higher, the weighting member 170 can be made of a heavy metal (such as tungsten or molybdenum), an alloy thereof or a sintered metal thereof. In consideration of effects on the human body the weighting member 170 is preferably free of lead.

Furthermore, the piezoelectric element 150 is desirably made of a sintered piezoelectric ceramic material mainly composed of $(Bi_{0.5}Na_{0.5})TiO_3$, $(Bi_{0.5}K_{0.5})TiO_3$ and $BaTiO_3$ (hereinafter referred to as "BNT", "BKT" and "BT", respectively).

Although the use of a lead-free piezoelectric element in a knock sensor being examined as an environmental protection measure, the knock sensor with the lead-free piezoelectric element generally shows a lower signal output characteristic than that with a lead-containing piezoelectric element as described above. With the piezoelectric element 150 made of the BNT-BKT-BT sintered piezoelectric ceramic material to be lead-free, however, it becomes possible for the knock sensor 100 to attain the signal output characteristic at the same level as that with the lead-containing piezoelectric element. Herein, the term "lead-free piezoelectric element" means a piezoelectric element containing lead in an amount of less than 0.001% by mass, as measured by fluorescent X-ray analysis, based on the total mass of the piezoelectric element.

It is assumed that the chemical composition of the main BNT-BKT-BT constituent of the sintered piezoelectric ceramic material is expressed as $BNT_xBKT_yBT_z$ where x, y and z (x+y+z=1) represent the mole fractions of the BNT, BKT and BT components, respectively. In order for the piezoelectric element 150 to attain high sensitivity and heat resistance, it is desirable to control the mole fractions of the BNT, BKT and BT components in such a manner as to satisfy the following expressions; $0.5 \leq X \leq 0.9$, $0 < y \leq 0.5$ and $0 < z \leq 0.5$. This allows the knock sensor 100 to show high sensitivity and heat resistance.

Next. A nonresonant-type knock sensor 200 according to the second embodiment of the invention will be explained. The knock sensor 200 is structurally similar to the knock sensor 100 as shown in FIG. 1, except that at least of a flange portion 222 of a metallic shell 220 of the knock sensor 200 is made of a material having a lower specific gravity than that of iron. The flange portion 222 can be formed integral with a cylindrical portion 221 of the metallic shell 220 (the whole of the metallic shell 220 can be formed from the material having a lower specific gravity than that of iron). Alternatively, the cylindrical portion 221 and the flange portion 222 can be formed separately and joined together by e.g. adhesive bonding or welding (only the flange portion 222 can be formed from the material having a lower specific gravity than that of iron).

Figure 3:
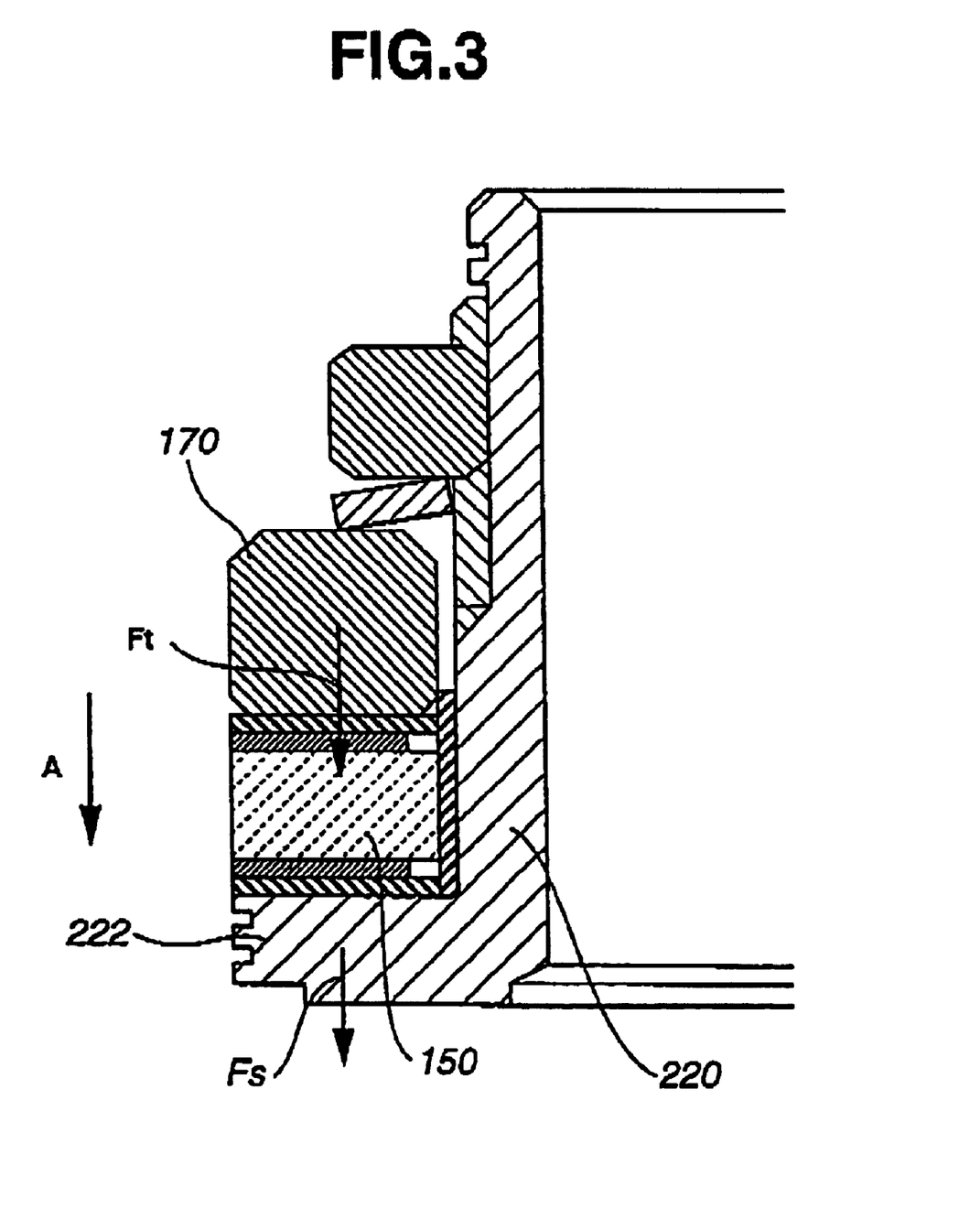
FIG. 3 is an illustration showing the operation of the nonresonant type knock sensor.

The operation of the knock sensor 200 will be now described below with reference to FIG. 3 in order to facilitate the understanding of the second embodiment. Herein, the effect of a sensor casing 210 is left out of consideration. When the knock sensor 200 receives an acceleration A with the operation of the engine, the piezoelectric element 150 receives a mechanical load F that can be expressed as the difference between a force Pt acting on the weighting member 170 and a force Fs acting on the flange portion 222 (F=Ft−Fs). Then, the piezoelectric element 150 develops a voltage output V responsive to the mechanical load P exerted on the piezoelectric element 150. As the forces Ft and Fs acting on the weighting member 170 and the flange portion 222 are proportional to a weight Wt of the weighting member 170 and a weight Ws of the flange portion 222, respectively, it is concluded that the voltage output V from the piezoelectric element 150 is in proportion to the difference between the weight Wt of the weighting member 170 and the weight Ws of the flange portion 222 ($V \partial Wt-Ws$). Accordingly, the signal output from the piezoelectric sensor 150 can be increased with decrease in the weight of the flange portion 222.

A metallic shell of a conventional knock sensor is generally made of iron or brass, whereas at least the flange portion 222 of the metallic shell 220 is made of the material having a lower specific gravity than that of iron. The flange portion 222 is therefore made lighter in weight so that the signal output characteristic of the knock sensor 200 can be improved without upsizing of the sensor 200 as described above.

The material having a lower specific gravity than that of iron can be exemplified by a resinous material (such as polyphenylene sulfide PPS) and a metallic material. In consideration of heat resistance, it is desirable to use the metallic material, preferably aluminum. The specific gravity of aluminum (about 2.7) is as low as only about 35% of the specific gravity of iron (about 7.9). The use of aluminum thus offers sufficient weight reduction of the flange portion 222 for improvement of the signal output characteristic of the knock sensor 200. Further, aluminum is suitable for the metallic shell 222 because of its hardness and availability. In addition, aluminum is highly resistant to corrosion. Although the metallic shell made of iron needs to be given plating (such as zinc chromate plating) so as to improve corrosion resistance, such plating becomes unnecessary through the use of aluminum. It becomes possible to simplify the manufacturing process of the knock sensor 200.

Figure 6:
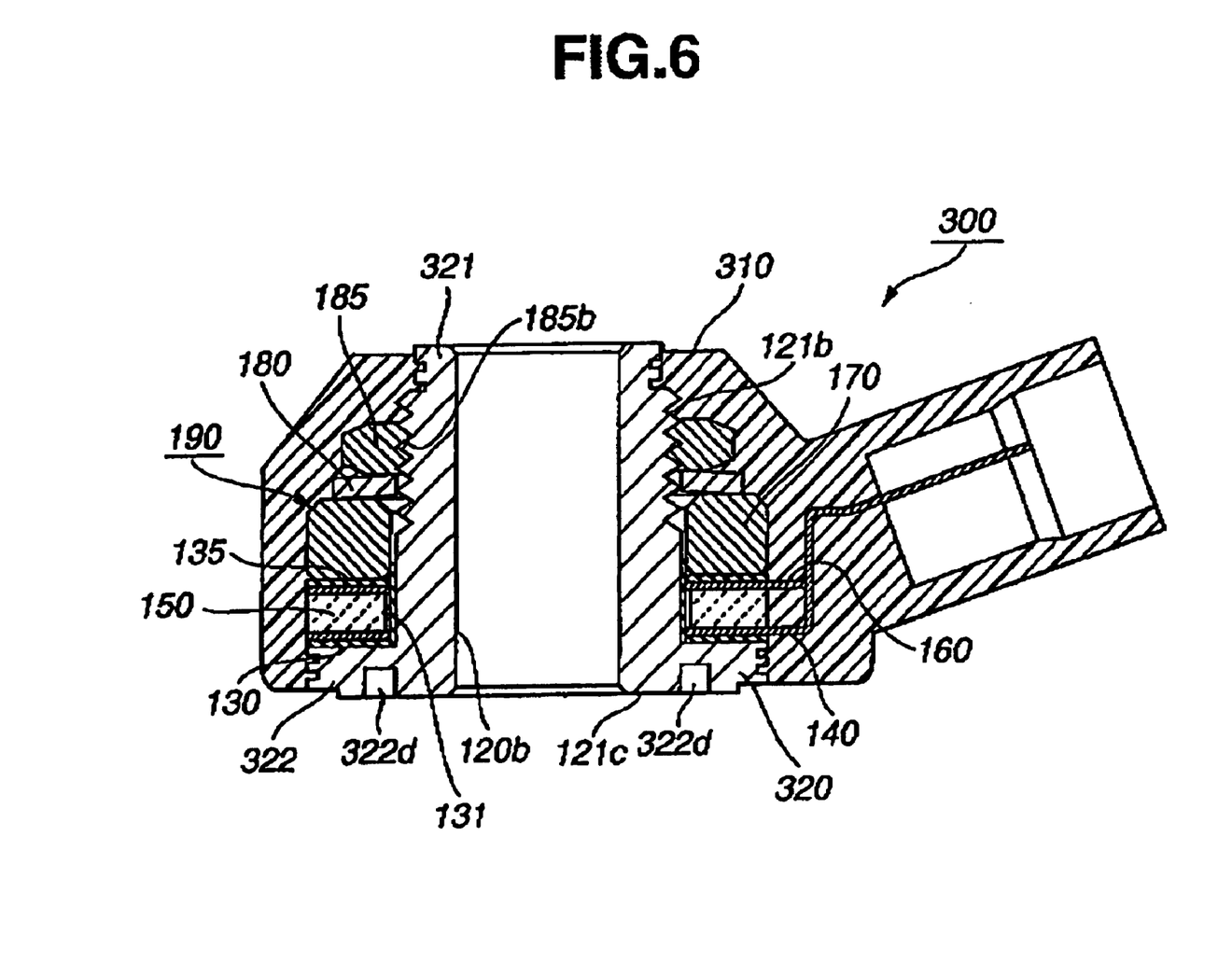
FIG. 6 is a sectional view of a nonresonant type knock sensor according to a third embodiment of the present invention.

A nonresonant-type knock sensor 300 according to the third embodiment of the invention will be described. The knock sensor 300 is structurally similar to the knock sensors 100 and 200 as shown in FIG. 6, except that a metallic shell 320 of the knock sensor 300 has at least one cut formed in its flange portion 322 so that the flange portion 322 can be made lighter in weight. This makes it possible to improve the signal output characteristic of the knock sensor 300 without upsizing of the sensor 300 for the same reason as described above in the second embodiment.

There may be edges and burrs caused by forming the cut or cats in the flange portion 322. In such a case, it is desirable that such edges and burrs are given chamfering so that the flange portion 322 is closely held onto the piezoelectric element 150 and the cylinder block for stable signal output characteristic of the knock sensor 300.

The out or cuts are preferably formed in one side of the flange portion 322 opposite to the side facing toward the piezoelectric element 150. If the out or cuts are formed in the side of the flange portion 322 facing toward the piezoelectric element 150, the piezoelectric element 150 becomes less prone to vibrations caused by the knocking. Accordingly, there arises a possibility that the output voltage of the piezoelectric element 150 may be lowered and/or the waveform of the output voltage of the piezoelectric element 150 may be distorted. With the cut or cuts formed in the side of the flange portion 322 opposite to the side facing toward the piezoelectric element 150, however, it becomes possible to effectively prevent the output voltage of the piezoelectric element 150 from being lowered or distorted and, at the same time, to reduce the weight of the flange portion 322 for improvement in the signal output characteristic of the knock sensor 300.

Figure 7A:
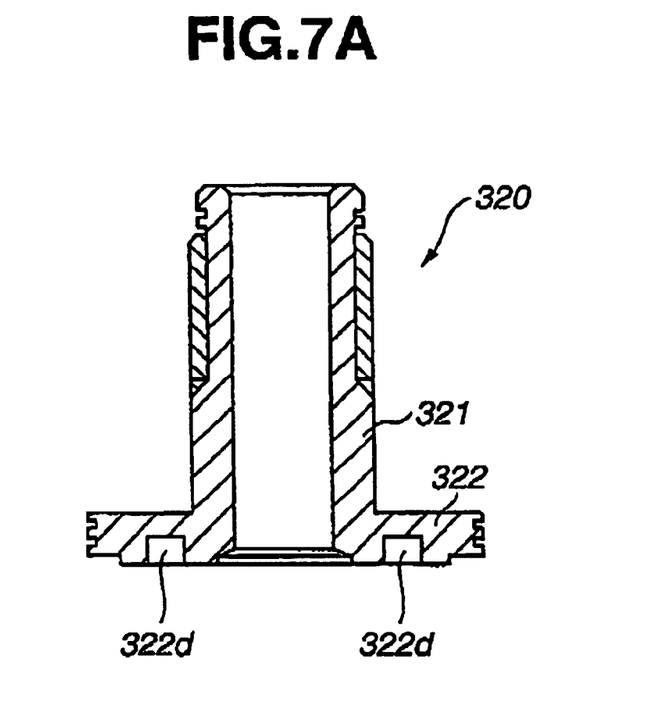
FIG. 7A is a sectional view of a metallic shell of the knock sensor of FIG. 6.
Figure 7B:
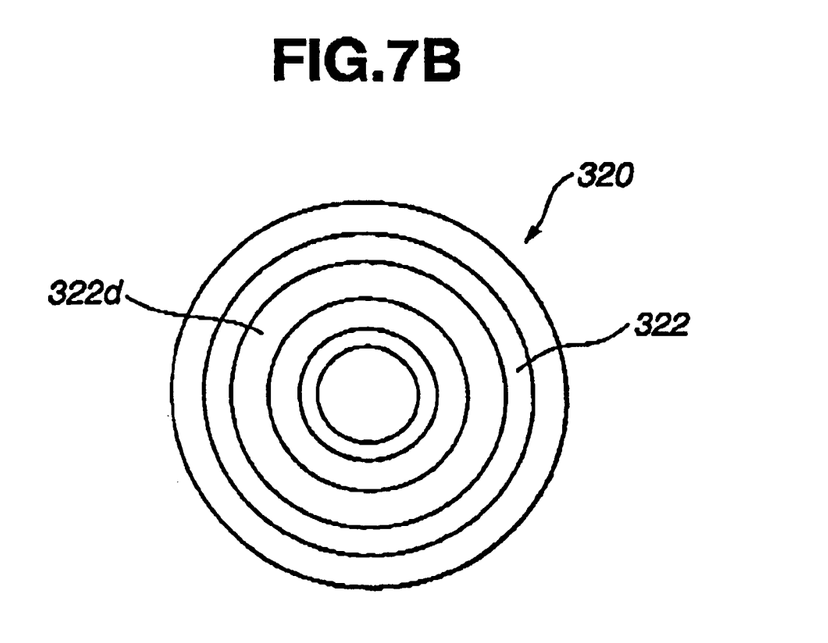
FIG. 7B is a bottom view of the metallic shell of FIG. 7A.
Figure 8A:
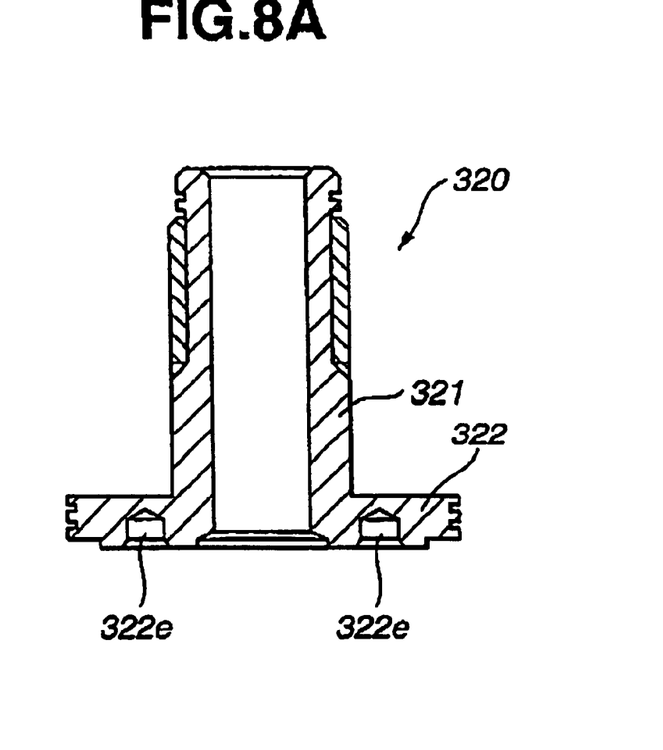
FIG. 8A is a sectional view of a metallic shell according to a modification of the third embodiment.
Figure 8B:
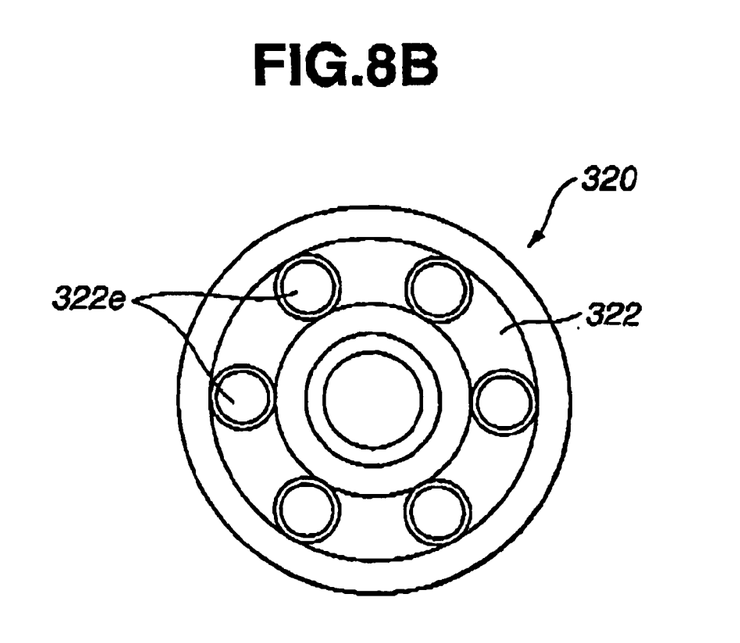
FIG. 8B is a bottom view of the metallic shell of FIG. 8A.
Figure 9A:
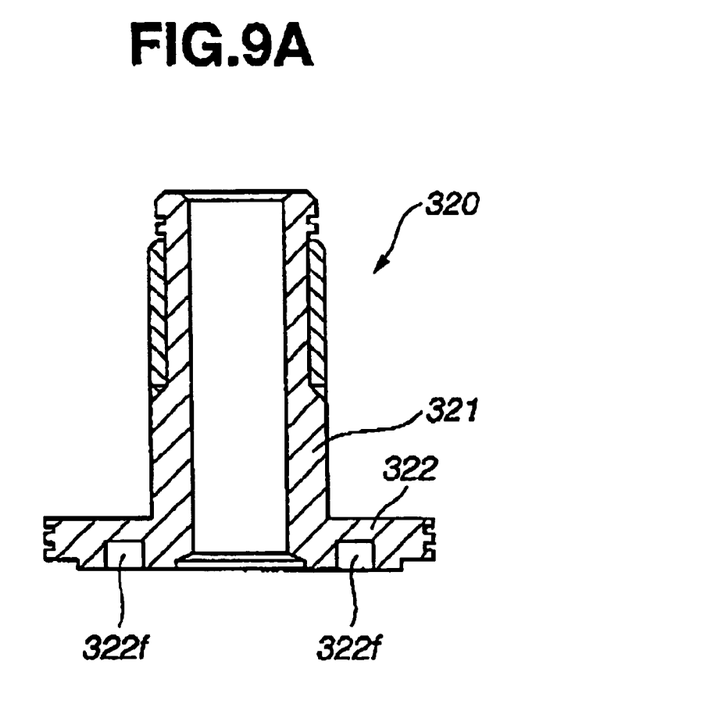
FIG. 9A is a sectional view of a metallic shell according to another modification of the third embodiment.
Figure 9B:
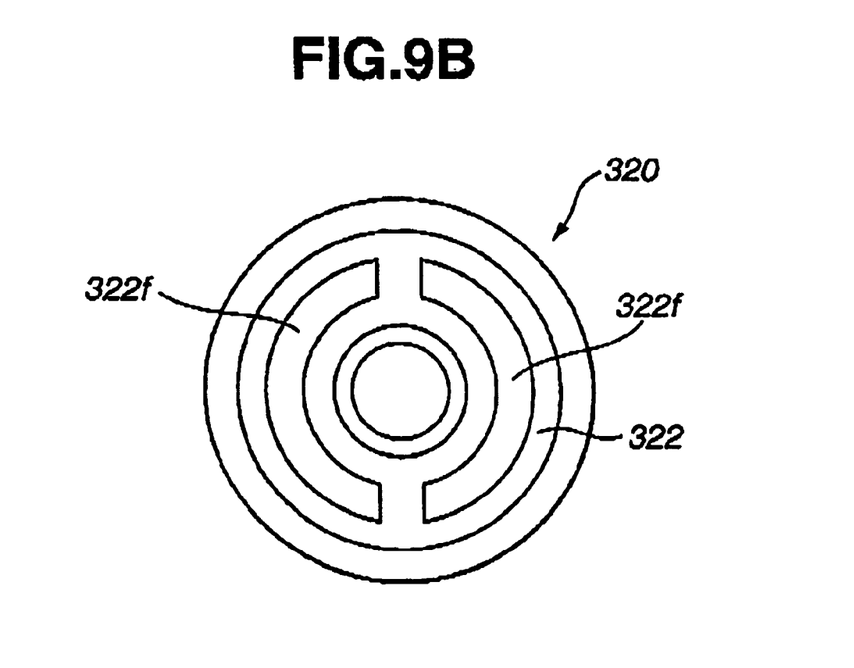
FIG. 9B is a bottom view of the metallic shell of FIG. 9B.

As shown in FIGS. 7A and 7B, a single cut groove 322*d* may be formed around a cylindrical portion 321 of the metallic shell 320 in order to improve the signal output characteristic of the knock sensor 300 effectively by reducing the weight of the flange portion 322 while keeping the weight balance of the flange portion 322. The groove 322*d* can be of any form, such as cyclic, star or polygonal form. Alternatively, a plurality of circumferentially evenly spaced depressions 322*e* may be formed around the cylindrical portion 321 as shown in FIGS. 8A and 8B. The shape of the depressions 322*e* is not limited to round shape, and can be any other shape, such as star or polygonal shape. As shown in FIGS. 9A and 9B, a plurality of grooves 322*f* may be formed around the cylindrical portion 322*f*. In such oases, it is also possible to use the depressions 322*e* or 322*f* for e.g. the fixing and positioning of the metallic shell 320 during the assembly of the knock sensor 300 in addition to reducing the weight of the flange portion 322.

Instead of forming at least one cut in the flange portion 322, one side of the flange portion 322 can be cut away in such a manner as to reduce the thickness of the flange portion 322 and thereby reduce the weight of the flange portion 322.

Further, the metallic shell 320 preferably has at least the flange portion 322 made of the material having a lower specific gravity than that of iron, more preferably aluminum, in the same manner as in the second embodiment to further reduce the weight of the flange portion 322.

The present invention will be described in more detail by reference to the following examples. It should be however noted that the following examples are only illustrative and not intended to limit the invention thereto.

EXAMPLES

Various samples of knock sensors were manufactured and tested for performance as follows.

A sample of the knock sensor 100 (SAMPLE 1) was manufactured by the following procedure. The respective sensor body parts were first prepared using the following materials: soft iron for the metallic shell 120 and the nut 185; polyolefin for the insulation sleeve 131; polyethylene terephthalate (PET) for the insulation plates 130 and 135; 42Ni—Fe alloy for the electrode plates 140 and 160; lead zirconate titanate (PZT) for the piezoelectric element 150; and tungsten (density: about 19.2 g/cm$^3$) for the weighting member 170. The prepared body parts were assembled into the sensor body 190, by: putting the insulation sleeve 131 on the cylindrical portion 121 of the metallic shell 120; fitting the insulation plate 130, the electrode plate 140, the piezoelectric element 150, the electrode plate 160 and the insulation plate 135 around the insulation sleeve 131 in the order of mention; placing the weighting member 170 on the insulation plate 135 to hold the piezoelectric element 150, the insulation plates 130 and 135 and the electrode plates 140 and 160 between the weighting member 170 and the flange portion 122; putting the spring washer 180 on the weighting member 170; and then screwing the nut 185 against the washer 180 in such a manner as to hold the insulation plates 130 and 135, the electrode plates 140 and 160, the piezoelectric element 150, the weighting member 170 and the washer 180 between the flange portion 122 and the nut 185 with a predetermined load imposed on the piezoelectric element 150. Then, a resin was prepared by mixing tungsten powder (true density: about 19.2 g/cm$^3$) into nylon in such a manner that the density of the resin was controlled to about 2.1 g/cm$^3$. The sensor casing 110 was integrally molded of the prepared tungsten-powder containing nylon resin by injection molding according to a known molding method, so as to circumferentially surround the sensor body 190 with the hole 120*b* of the metallic shell 120 exposed externally of the sensor casing 110.

For reference purposes, a knock sensor was prepared as REFERENCE SAMPLE by the same procedure and with the same dimensions as used for SAMPLE 1, except that the corresponding weighting member and sensor casing were made of brass (density: about 8.0 g/cm$^3$) and nylon (density: about 1.5 g/cm$^3$), respectively. The metallic shell of REFERENCE SAMPLE had no groove/depression formed in its flange portion for weight reduction of the flange portion.

Performance comparisons were made between SAMPLE 1 and REFERENCE SAMPLE. The weighting portion 111 of SAMPLE 1 had a density of about 2.1 g/cm$^3$ that was larger than that of the corresponding portion of REFERENCE SAMPLE (about 1.5 g/cm$^3$), so that the weighting portion 111 of SAMPLE 1 weighed more than the corresponding portion of REFERENCE SAMPLE even in the same size. The weighting member 170 of SAMPLE 1 had a density of about 19.2 g/cm$^3$ that was larger than that of the corresponding member of REFERENCE SAMPLE (about 8.0 g/cm$^3$), so that the weighting portion 170 weighed more than the corresponding member of REFERENCE SAMPLE even in the same size. SAMPLE 1 was therefore able to apply an increased mechanical load to the piezoelectric element 150 under the load of the weighting portion 111 and the weighting member 170 without increasing in size and then to achieve an improved signal output characteristic.

Further, the density of the resin of the sensor casing 110 was controlled to about 2.1 g/cm$^3$ by adding a very small amount of the tungsten powder with a true density of about 19.2 g/cm$^3$. The volume content of the tungsten powder in the resin was so low that the resin was molded into the sensor casing 100 without trouble and did not cause deterioration in the insulation resistance between the opposite sides of the piezoelectric element 150.

Another sample of the knock sensor 100 (SAMPLE 2) was manufactured by the same procedure and with the same dimensions as used for SAMPLE 1, except that the electrically insulative tungstic oxide (WO$_3$) powder was used in place of the tungsten powder.

As compared to REFERENCE SAMPLE mentioned above, SAMPLE 2 was able to attain an improved signal output characteristic in the same manner as SAMPLE 1. In addition, the insulation property of the sensor casing 110 was secured assuredly by the use of the electrically insulative tungstic oxide powder. There was no fear of electrical conduction between the electrode plates 140 and 160 via the sensor casing 110 and no fear of insufficient insulation of the connector portion 113. The density of the sensor casing 110 was controlled as appropriate without regard to the amount of the tungstic oxide powder added to apply an increased mechanical load to the piezoelectric element 150, while the moldability of the resin was maintained.

Next, a sample of the knock sensor 200 (SAMPLE 3) was manufactured by the same procedure and with the same dimensions as used for SAMPLE 1, except that the metallic shell 220, the weighting member 170 and the sensor casing 210 were made of aluminum (available as "KS27" from Furukawa Electric Co., Ltd. according to JIS H4040), brass and nylon, respectively. In other words, SAMPLE 3 differed from REFERENCE SAMPLE in that: the corresponding metallic shell of REFERENCE SAMPLE was made of iron, whereas the metallic shell 220 of SAMPLE 3 was made of aluminum to reduce the weight of the flange portion 222.

Figure 4:
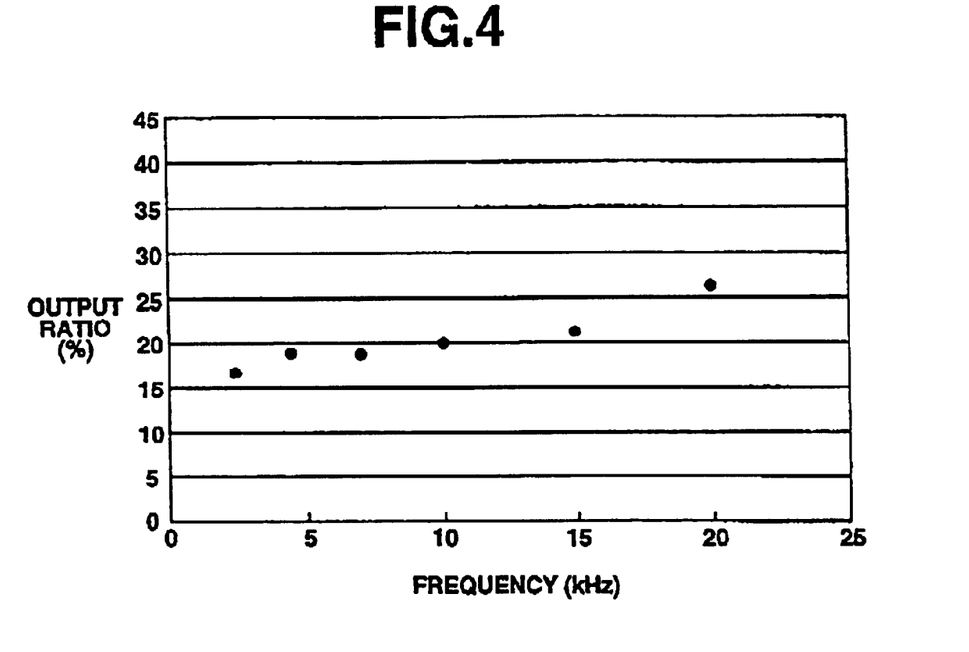
FIG. 4 is a graph showing an improvement in signal output achieved by the knock sensor according to the second embodiment of the present invention under room temperature conditions.
Figure 5:
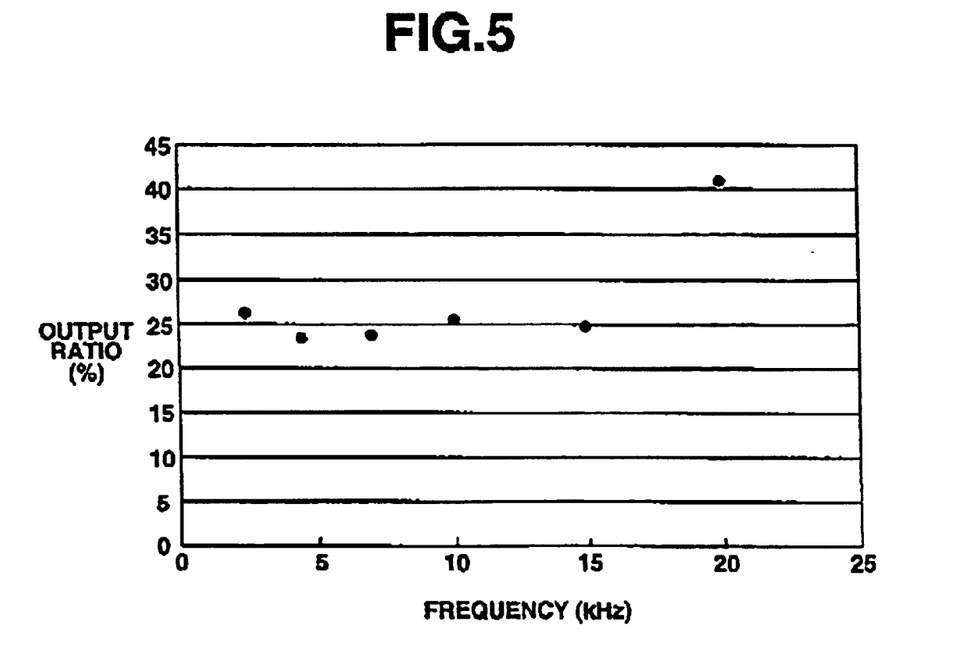
FIG. 5 is a graph showing an improvement in signal output achieved by the knock sensor according to the second embodiment of the present invention under high temperature conditions.

Performance comparisons were made between SAMPLE 3 and REFERENCE SAMPLE as follows. Each of SAMPLE 3 and REFERENCE SAMPLE was mounted in the cylinder head of an internal combustion engine, and the signal outputs from SAMPLE 3 and REFERENCE SAMPLE were measured at room temperature with respect to varying engine vibration frequencies. The average of the measured signal outputs was calculated against each vibration frequency. Then, the signal output ratio of SAMPLE 3 to REFERENCE SAMPLE at room temperature were calculated by the following expression:

$$\text{Output ratio}=(Al_{avg}-Fe_{avg})\times 100/Fe_{avg}$$

where $Al_{avg}$ is the average of the signal outputs from SAMPLE 3 at a given engine vibration frequency; and $Fe_{avg}$ is the average of the signal outputs from REFERENCE SAMPLE at the given engine vibration frequency. The results are shown in FIG. 4. Further, the signal output ratio of SAMPLE 3 to REFERENCE SAMPLE was determined at 125° C. in the same way as above. The results are shown in FIG. 5. As is apparent from FIGS. 4 and 5, SAMPLE 3 had 15% or more of improvement in signal output at room temperature and 23% or more of improvement in signal output at 125° C. as compared to REFERENCE SAMPLE. SAMPLE 3 was able to apply an increased mechanical load to the piezoelectric element 150 by reducing the flange portion 222 in weight without increasing in size, and therefore able to attain an improved signal output characteristic. Further, aluminum was suitably used for the metallic shell 220 due to its hardness and availability. There was no need to give plating treatment in the preparation of the metallic shell 222 because of high corrosion resistance of aluminum, so that the manufacturing process of SAMPLE 3 was simplified.

A sample of the knock sensor 300 (SAMPLE 4) was manufactured by the same procedure and with the same dimensions as used for SAMPLE 1, except that the weighting member 170 and a sensor casing 310 were made of brass and nylon, respectively, and that the metallic shell 320 had a groove 322d formed in one side of the flange portion 322 opposite to the side facing toward the piezoelectric element 150. In other words, SAMPLE 4 differed from Reference example in that: the corresponding portion of REFERENCE SAMPLE had no groove, whereas the flange portion 322 of the SAMPLE 4 had the groove 322d formed therein to reduce the weight of the flange portion 322.

As compared to REFERENCE SAMPLE, SAMPLE 4 was able to apply an increased mechanical load on the piezoelectric element 150 by reducing the flange portion 322 in weight without increasing in size, and therefore able to attain an improved signal output characteristic.

Another sample of the knock sensor (SAMPLE 5) was manufactured by the same procedure and with the same dimensions as used for SAMPLE 4, except that the metallic shell 320 was made of aluminum so as to further reduce the weight of the flange portion 322. Accordingly, SAMPLE 5 was able to attain more improvement in the signal output characteristic than that attained by SAMPLE 4.

Still another sample of the knock sensor 300 (SAMPLE 6) was by the same procedure and with the same dimensions as used for SAMPLE 5, expect that the piezoelectric element 150 was made of a sintered piezoelectric ceramic material mainly composed of BNT, BKT and BT as follows. The BNT-BKT-BT sintered piezoelectric ceramic material was prepared by using as starting materials $BaCO_3$ powder, $K_2CO_3$ powder, $NaZCO_3$ powder and $TiO_2$ powder. The $BaCO_3$ powder, $K_2CO_3$ powder, $Na_2CO_3$ powder and $TiO_2$ powder were dispensed so that the ratio of mole fractions x, y and z of BZT, BKT and BT components in the ceramic material was controlled to x:y:z=0.80:0.10:0.10. Ethanol was added to the $Baco_3$ powder, $K_2CO_3$ powder, $Na_2CO_3$ powder and $TiO_2$ powder and subjected to wet blending for 15 hours by using a ball mill. The resultant mixture was put in hot water, dried, and calcinated at 800° C. for 2 hours. The calcinated mixture was subjected to wet milling for 15 hours by using a boll mill, put in hot water and then dried to obtain a granulation of the BNT-BKT-BT sintered piezoelectric ceramic material. The granulation was formed to a predetermined size by uniaxial pressing with a pressure of 1 GPa and subjected to cold isostatical press (CIP) with a pressure of 15 GPa. The thus-obtained formed article was sintered at 1050 to 1250° C. for 2 hours. Silver electrodes were formed on the sintered article and subjected to polarization process, thereby completing the piezoelectric element 150.

Although the piezoelectric element 150 of SAMPLE 6 was lead-free, SAMPLE 6 was able to attain the same level of signal output characteristic as that of SAMPLE 5. As there was no dispersion of lead during the sintering of the ceramic material, SAMPLE 6 was more environmentally friendly. Further, the piezoelectric element 150 of SAMPLE 6 satisfied the following expressions: $0.5 \leq X < 0.9$, $0 < y \leq 0.5$ and $0 < z \leq 0.5$ so that the piezoelectric element 150 had high sensitivity and heat resistance. Namely, SAMPLE 6 showed high sensitivity and heat resistance.

The entire contents of Japanese Patent Application Nos. 2002-127301 (filed on Apr. 26, 2002), 2002-243746 (filed on Aug. 23, 2002) and 2002-251320 (filed on Aug. 29, 2002) are herein incorporated by reference.

Although the present invention has been described with reference to specific embodiments of the invention, the invention is not limited to the above-described embodiments. Various modification and variation of the embodiment described above will occur to those skilled in the art in light of the above teaching. For example, the weighting member 170, the conical spring washer 180 and the nut 185 may be formed into one piece so as to reduce the parts count of the sensor. The scope of the invention is defined with reference to the following claims.

What is claimed is:

1. A knock sensor, comprising:
   a metallic shell including a cylindrical portion and a flange portion formed at an end of the cylindrical portion;
   an annular piezoelectric element fitted around the cylindrical portion; and
   an annular weighting member fitted around the cylindrical portion to hold the piezoelectric element between the weighting member and the flange portion,
   wherein at least the flange portion of the metallic shell is made of a material having a lower specific gravity than that of iron and the weighting member has a specific gravity that is higher than that of the flange portion.

2. The knock sensor according to claim 1, wherein the material is a metallic material.

3. The knock sensor according to claim 2, wherein the metallic material is aluminum.

4. The knock sensor according to claim 1, wherein the piezoelectric element is made of a sintered piezoelectric ceramic material mainly composed of $(Bi_{0.5}Na_{0.5})TiO_3$, $(Bi_{0.5}K_{0.5})TiO_3$ and $BaTiO_3$.

* * * * *